(12) United States Patent
MacConnell

(10) Patent No.: US 6,996,215 B2
(45) Date of Patent: Feb. 7, 2006

(54) TELEMETRY SYSTEM AND METHOD

(76) Inventor: John Walter MacConnell, P.O. Box 278, La Canada, CA (US) 91012

( * ) Notice: Subject to any disclaimer, the term of this patent is extended or adjusted under 35 U.S.C. 154(b) by 120 days.

(21) Appl. No.: 10/722,899

(22) Filed: Nov. 26, 2003

(65) Prior Publication Data

US 2004/0114737 A1    Jun. 17, 2004

Related U.S. Application Data

(60) Provisional application No. 60/429,832, filed on Nov. 27, 2002.

(51) Int. Cl.
*H04M 11/00*    (2006.01)

(52) U.S. Cl. ........................ 379/106.03; 340/870.02; 340/870.11; 455/108

(58) Field of Classification Search .......... 379/106.03; 340/870.02, 870.11, 10.33, 10.34; 370/335, 370/342, 346; 455/108
See application file for complete search history.

(56) References Cited

U.S. PATENT DOCUMENTS

| | | | |
|---|---|---|---|
| 4,387,296 A | 6/1983 | Newell et al. | |
| 5,056,107 A | 10/1991 | Johnson et al. | |
| 5,140,351 A | 8/1992 | Garcia et al. | |
| 5,553,096 A | 9/1996 | Messman | |
| 5,801,643 A | 9/1998 | Williams et al. | |
| 5,897,607 A | 4/1999 | Jenney et al. | |
| 5,963,146 A | 10/1999 | Johnson et al. | |
| 6,172,616 B1 | 1/2001 | Johnson et al. | |
| 6,333,975 B1 | 12/2001 | Brunn et al. | |
| 6,373,399 B1 | 4/2002 | Johnson et al. | |
| 6,653,945 B2 | 11/2003 | Johnson et al. | |
| 2002/0109607 A1 | 8/2002 | Cumeralto et al. | |
| 2003/0016142 A1 * | 1/2003 | Holmes et al. | ........ 340/870.11 |

\* cited by examiner

*Primary Examiner*—Melur Ramakrishnaiah
(74) *Attorney, Agent, or Firm*—Dicke, Billig & Czaja, PLLC

(57) ABSTRACT

One aspect of the present invention provides a meter reading system. The meter reading system includes an endpoint device and a reader. The endpoint device is configured to operably couple to a utility meter and includes a receiver, a control block, and a transmitter. The receiver is configured to periodically turn on for a first time period to measure a signal strength. The control block is configured to keep the receiver turned on for a second time period if the measured signal strength is at least equal to a threshold value so as to enable the receiver to receive a subsequent wake-up message. The transmitter is configured to transmit an endpoint signal in response to the wake-up message. The reader is configured to transmit the wake-up message and to receive the endpoint signal.

67 Claims, 10 Drawing Sheets

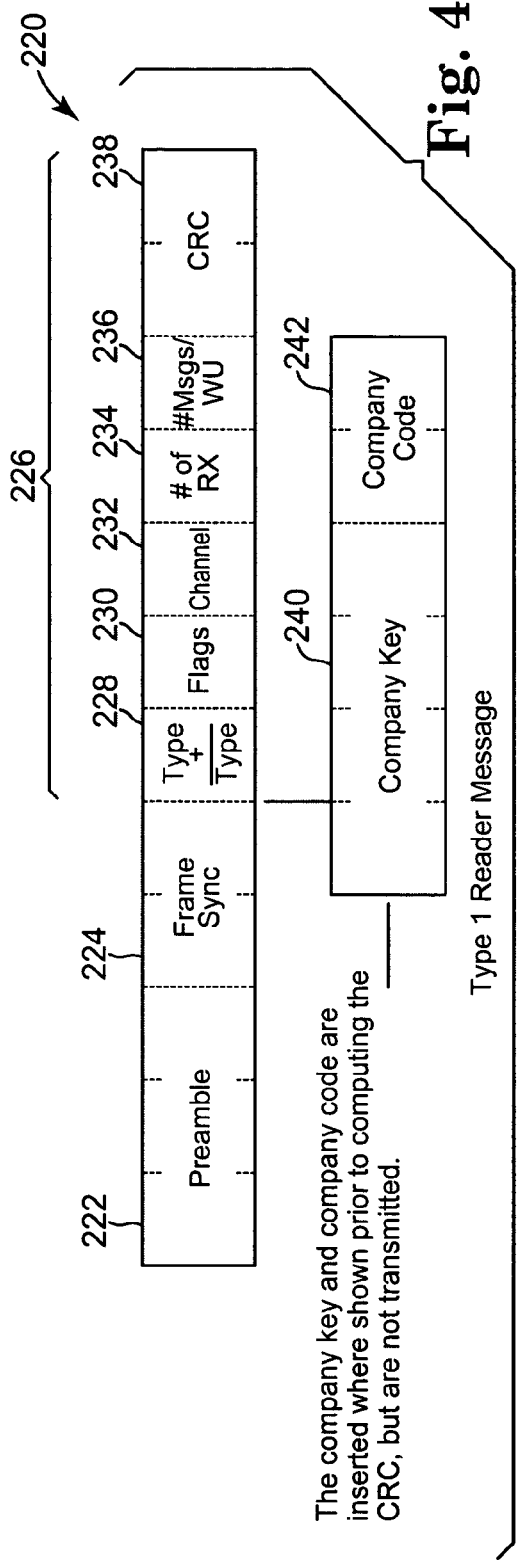
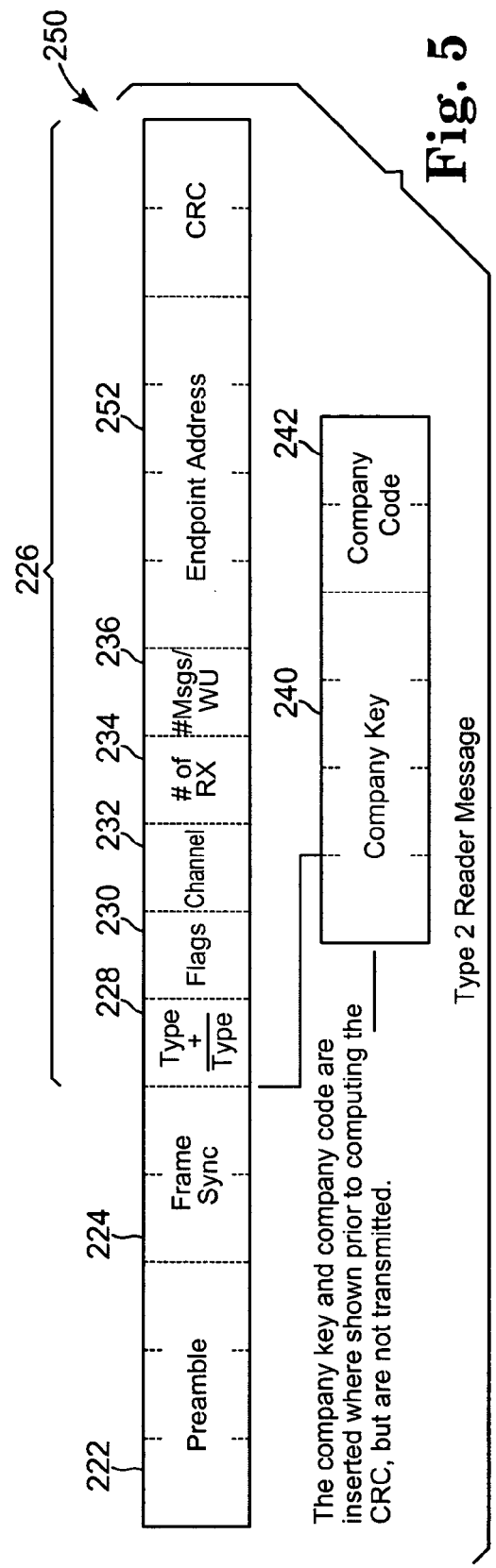

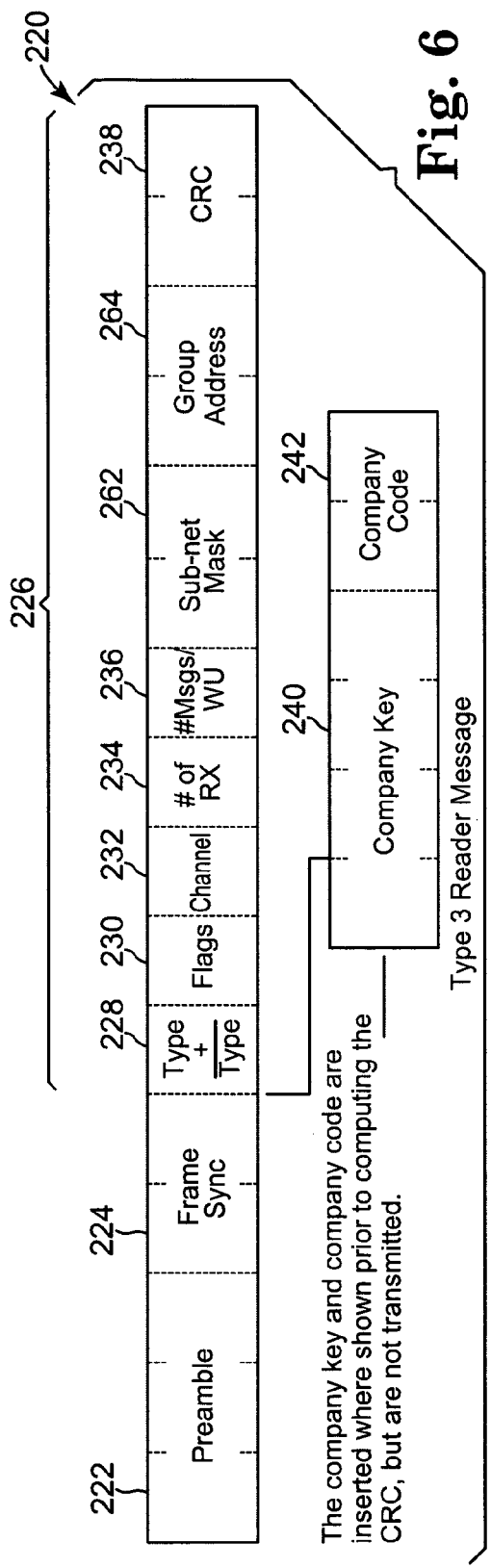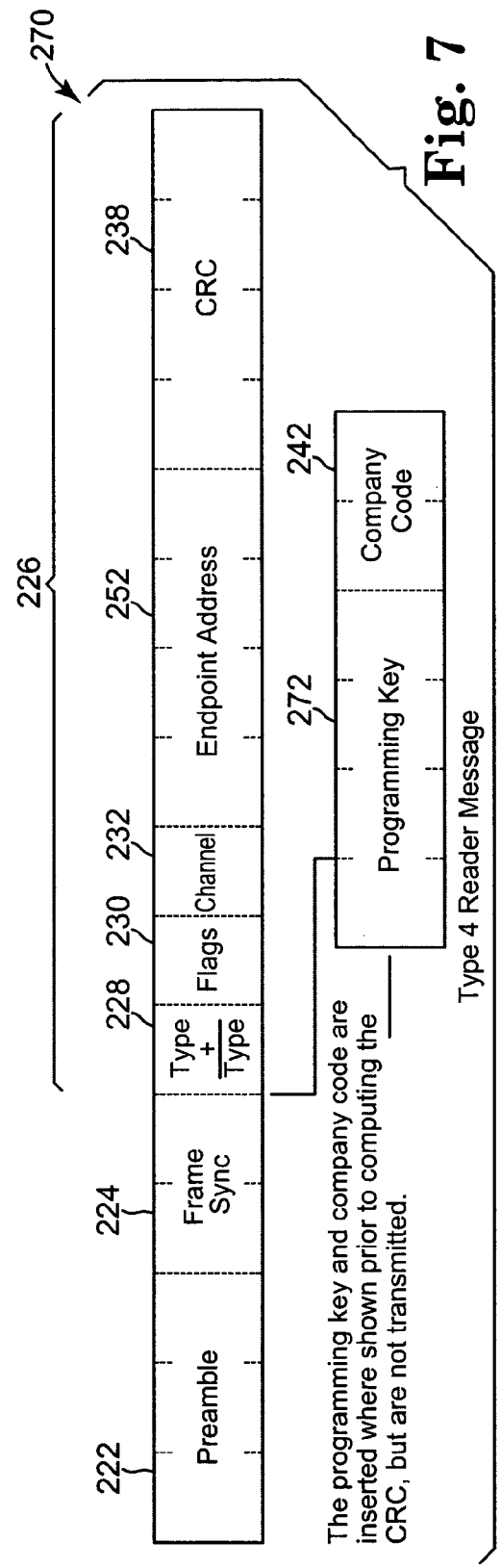

Type 2 Endpoint Message

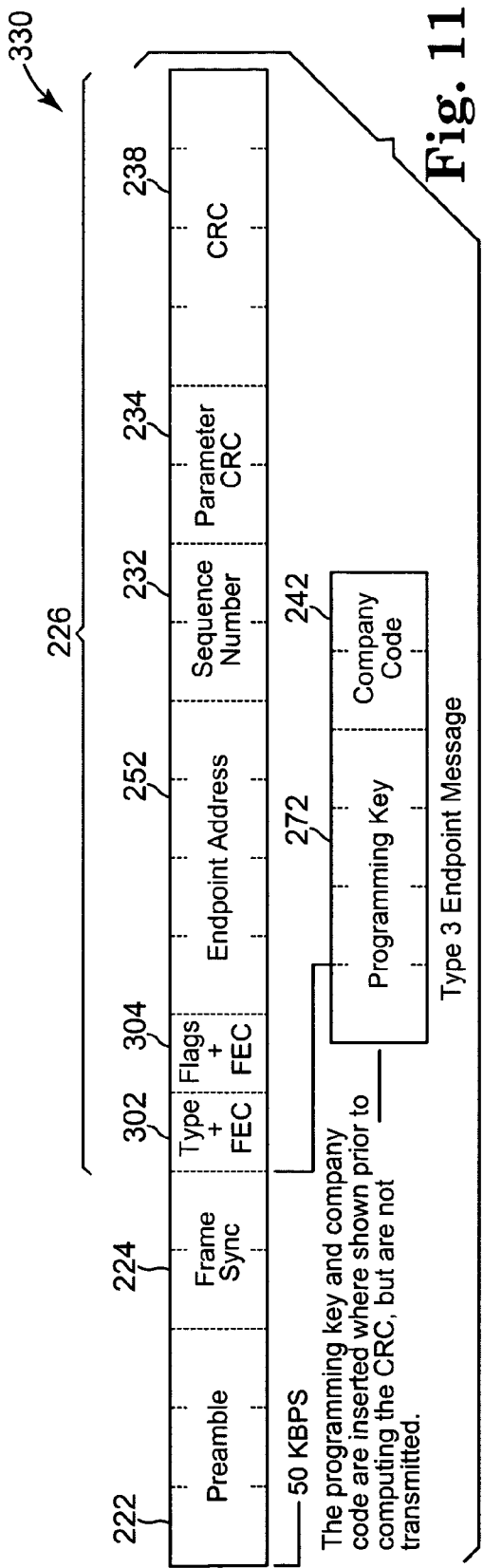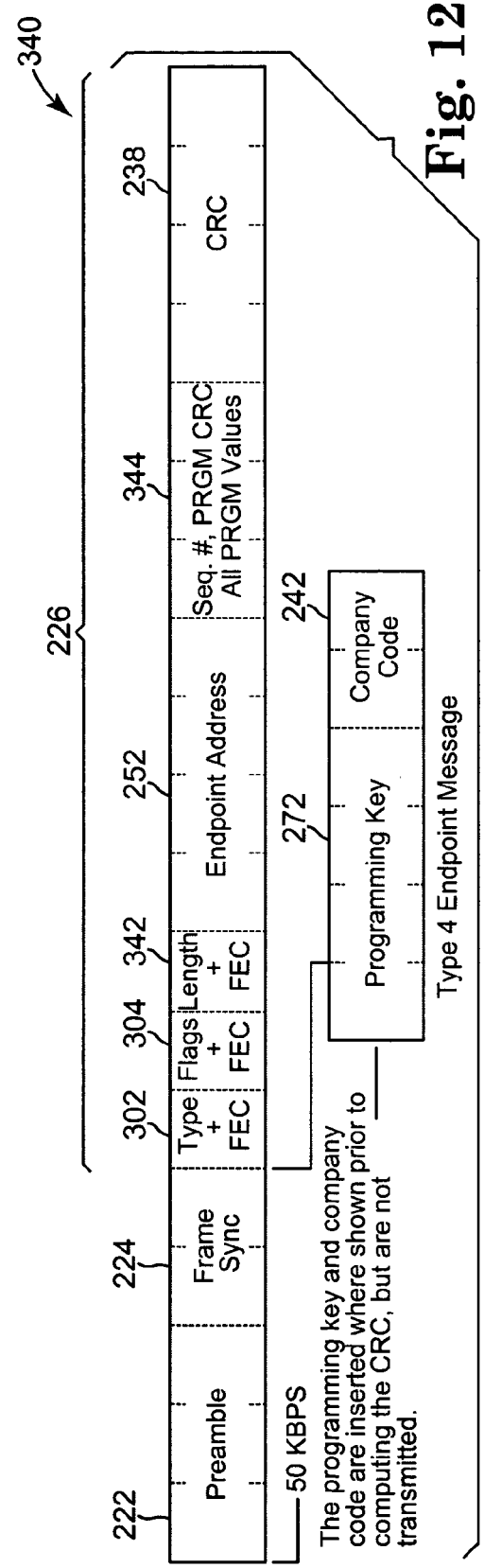

TELEMETRY SYSTEM AND METHOD

CROSS-REFERENCE TO RELATED APPLICATION

The subject matter of this application is related to the subject matter of U.S. Provisional Patent Application No. 60/429,832, filed Nov. 27, 2002, priority to which is claimed under 35 U.S.C. § 119(e) and which is incorporated herein by reference.

BACKGROUND OF THE INVENTION

Automated meter reading (AMR) systems are designed to retrieve consumption data from utility meters, such as gas, water, and electric meters. Two such systems are described by U.S. Pat. No. 6,333,975 and U.S. Patent Application Publication No. 2002/0109607 A1, both of which are herein incorporated by reference. AMR systems employ a variety of techniques for collecting data from transceivers installed at the meters, commonly referred to as "endpoints", including telephone connections, radio signals, optical signals, inductive probes, and direct electrical connections.

Radio based systems often employ a mobile reader device, carried either by a person on foot or by a vehicle, to periodically travel throughout a utility's service area and read the endpoints. In a first approach, the mobile reader device transmits a "wake-up" call to the endpoints. This technique is generally used for battery-operated endpoints which typically employ an ultra-low current receiver that listens for the wake-up call from the reader device. Upon "hearing" the wake-up call, the AMR endpoint transmits a data message, including meter consumption data, that is received by the mobile reader device. In a second approach, often referred to as "bubble-up", the AMR endpoints do not listen for a wake-up call, but instead periodically transmit a data message—often several times per second. A reader device then simply listens for the transmitted messages.

A second approach utilizes an existing public network, such as a cellular telephone network or a two-way paging network, to collect data from the endpoints. However, this method tends to be expensive because it requires more complex endpoints and network providers generally charge a substantial monthly fee per endpoint.

Another approach employs a geographically fixed system, or network, of reader devices that retrieve data messages from the AMR endpoints and forward them to some type of host system. Such a system can employ a wake-up type system transmitting wake-up calls to the AMR endpoints or receive data from bubble-up type endpoints.

When a network of reader devices is employed to read the endpoints, there is a substantial cost associated with installing each of the reader devices, or nodes. Since the number of nodes required is related to the transmission range of the endpoints, one way of reducing network costs is to increase the transmission range of the endpoints. The farther an endpoint can transmit, the fewer the nodes that are required. In fact, the number of network nodes required is inversely proportional to the square of the endpoint transmission range. Therefore, if the endpoint transmission range can be doubled, the number of network nodes can be reduced by a factor of four. Also, because of the costs associated with installing network nodes, it is often desirable for utilities to begin an AMR system "rollout" by first reading endpoints with a mobile-type reader and later upgrading to a fixed network system.

AMR systems generally transmit a meter's consumption data, or reading, via the endpoint either when commanded by a reader or periodically on a bubble-up basis. Typically, a customer's bill is based on the value of the metered product, such as electricity or gas, at the time the meter is read. However, given current economic conditions regarding energy and water, utilities are becoming increasingly interested in adjusting the price of the product as a function of the time when it was consumed, since an electric rate, for instance, might be more expensive at time of peak electrical usage. This is generally referred to as a time-of-use billing system.

However, because conventional AMR endpoints typically provide a single consumption value at the time a meter is read, it is generally not possible to use a mobile reader device to read a meter's usage as a function of time. While this is not a problem for a network system, which can continuously accumulate meter readings and derive a profile of usage versus time, such systems can be very costly.

Conventional AMR systems generally utilize very low current super-regenerative type receivers in the endpoint devices. Super-regenerative type receivers have a low sensitivity and are not able to receive data at rates much over sixty bits per second when running extremely low current. Furthermore, such receivers have a large bandwidth making them susceptible to interference. Conventional AMR systems often utilize an audio tone of around 30 Hz to wake-up the endpoints. The endpoints respond to the wake-up call by on-off keying an oscillator in the 902-to-928 MHz ISM band. To avoid signal collisions and to meet FCC requirements, the endpoints "frequency hop" the oscillator within the band. However, since the transmitter is not crystal-controlled, it is not known precisely at which frequency the endpoints will transmit.

One conventional high performance approach employed to overcome this shortcoming is to employ a reader having multiple receivers fix-tuned at every few hundred KHz across the band. One known reader system employs forty-eight receivers. Such a reader is expensive and bulky in size. Another approach is to employ a reader having a wideband receiver. While such an approach works, the wideband receiver is very susceptible to interference and is limited in sensitivity due to its wide bandwidth. Still other systems use narrower bandwidth sweeping-type receivers or FFT-based receivers. Such systems suffer from high cost, performance, or weight.

SUMMARY OF THE INVENTION

One aspect of the present invention provides a meter reading system. The meter reading system includes an endpoint device and a reader. The endpoint device is configured to operably couple to a utility meter and includes a receiver, a control block, and a transmitter. The receiver is configured to periodically turn on for a first time period to measure a signal strength. The control block is configured to keep the receiver turned on for a second time period if the measured signal strength is at least equal to a threshold value so as to enable the receiver to receive a subsequent wake-up message. The transmitter is configured to transmit an endpoint signal in response to the wake-up message. The reader is configured to transmit the wake-up message and to receive the endpoint signal.

BRIEF DESCRIPTION OF THE DRAWINGS

Embodiments of the invention are better understood with reference to the following drawings. The elements of the drawings are not necessarily to scale relative to each other. Like reference numerals designate corresponding similar parts.

FIG. 4 is a diagram illustrating one exemplary embodiment of a Type 1 Reader Message for use with a meter reading system according to the present invention.

FIG. 5 is a diagram illustrating one exemplary embodiment of a Type 2 Reader Message for use with a meter reading system according to the present invention.

FIG. 6 is a diagram illustrating one exemplary embodiment of a Type 3 Reader Message for use with a meter reading system according to the present invention.

FIG. 7 is a diagram illustrating one exemplary embodiment of a Type 4 Reader Message for use with a meter reading system according to the present invention.

FIG. 11 is a diagram illustrating one exemplary embodiment of a Type 3 Endpoint Message for use with a meter reading system according to the present invention.

FIG. 12 is a diagram illustrating one exemplary embodiment of a Type 4 Endpoint Message for use with a meter reading system according to the present invention.

DESCRIPTION OF THE PREFERRED EMBODIMENTS

In the following detailed description of the preferred embodiments, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
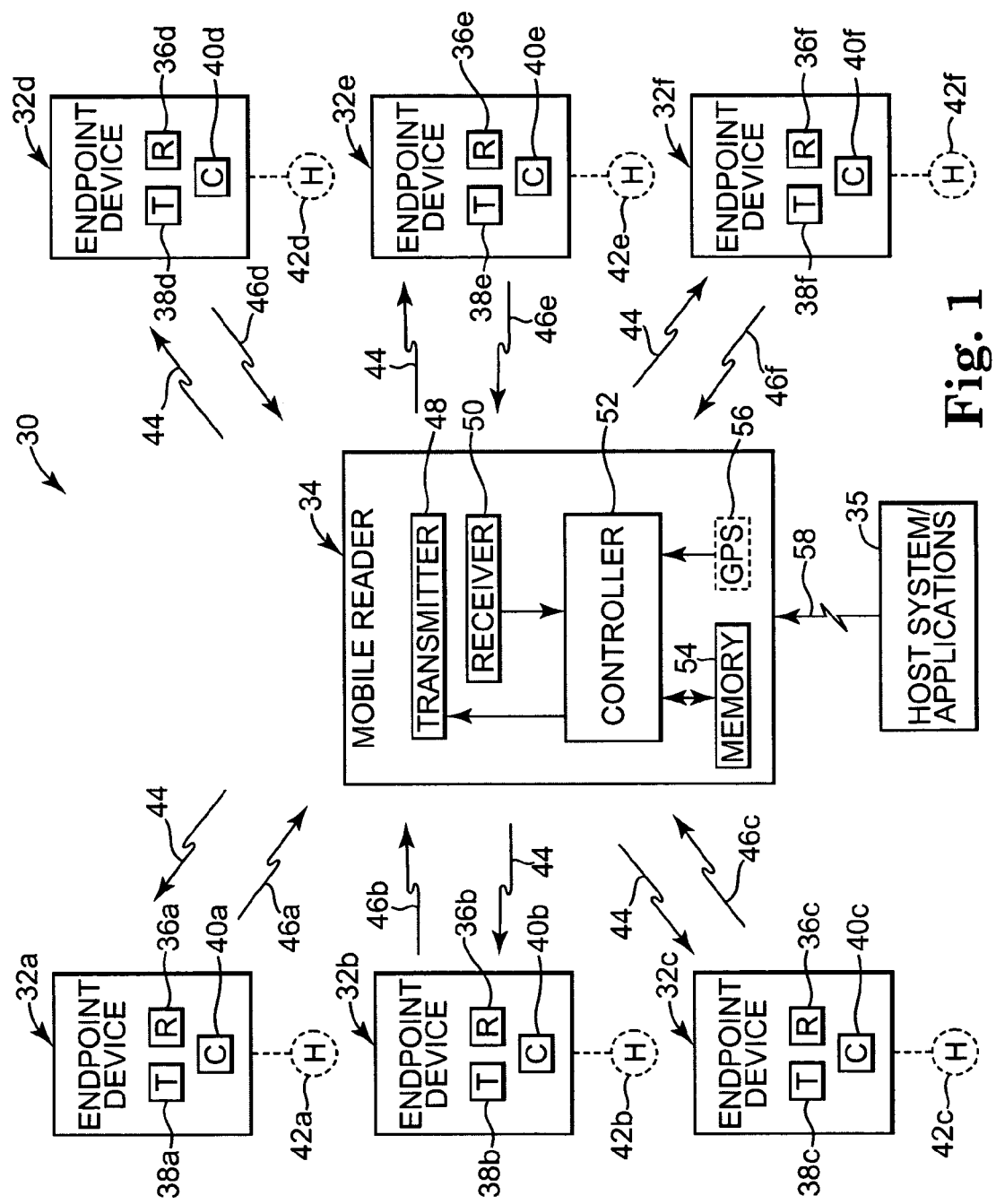
FIG. 1 is a block diagram illustrating generally one exemplary embodiment of a telemetry system according to the present invention.

FIG. 1 is a block diagram illustrating generally one exemplary embodiment of a telemetry system 30 according to the present invention. Telemetry system 30 includes a plurality of endpoints devices 32, a reader 34, and a host system 35. Endpoint devices 32 further include a receiver 36, a transmitter 38, and a controller 40, and are configured to operably couple to a corresponding host device 42. Reader 34 further includes a transmitter 48, a receiver 50, a controller 52, and a memory 54.

Receiver 36 of endpoint device 32 is normally powered-off, and is configured to periodically power-on for a first time period to measure a strength of signals received during the first time period. Controller 40 is configured to keep receiver 36 powered-on for a second time period in response to the measured signal strength being at least equal to a threshold level. If the measured signal strength is less than the threshold level, controller 40 is configured to power-off receiver 36 until a subsequent first time period. In one embodiment, controller 40 measures the signal strength using received signal strength indication (RSSI) techniques.

Transmitter 38 is configured to transmit an endpoint signal 46 in response to the receiver receiving a wake-up message 44 during the second time period, wherein the endpoint signal 46 comprises information related to the operation of corresponding host device 42. In one embodiment, transmitter 38 is configured to transmit data at a rate of up to 100 kilobytes per second (KBPS). In one embodiment, transmitter 38 has an output power of not less than 100 milliwatts, thus enabling endpoint devices 32 to transmit over a longer distance than conventional endpoint devices.

Reader 34 is configured to transmit wake-up message 44 via a transmitter 48 and to receive endpoint message 46 via a receiver 50. In one embodiment, reader 34 comprises a mobile reader. In one embodiment, reader 34 comprises a fixed, or static, device. Reader 34 is configured to communicate with host system 35 via a data link 58. Reader 34 is configured to transfer endpoint messages 46 received via receiver 50 to host system 35 and to receive operating instructions and application data from host system 35. In one embodiment, reader 34 further includes a global positioning system (GPS) 56, which will be discussed in greater detail below.

By using a two-stage "wake-up" procedure to keep receiver 36 powered-on for the second time period only when the measured signal strength is at or above the threshold value, receiver 36 operates at a low duty cycle and, therefore, at a low average current. In one embodiment, receiver 36 operates at a duty cycle of not more than 0.1% with an average current of not more than 10 microamps (uA). In one embodiment, endpoint device 32 is battery-operated. In one embodiment, receiver 36 comprises a superheterodyne (SH) receiver. In one embodiment, the low average current enables endpoint device 32 to be battery-operated while employing receiver 36 comprising an SH receiver.

By employing SH receivers 36, battery-powered endpoint devices 32 of telemetry system 30 are able to receive data at higher rates as compared to conventional battery-powered telemetry systems employing super-regenerative-type receivers. Additionally, SH receivers utilize a narrow bandwidth which reduces potential occurrences of interference. Also, by employing a high data rate, high power transmitter 38, battery-powered endpoint devices 32 are able to transmit endpoint messages comprising more data in a shorter amount of time and over greater distances as compared to conventional battery-powered telemetry systems.

In one embodiment, as will be described in more detail below, telemetry system 30 is configured as an automated meter reading (AMR) system, wherein host devices 42 comprise utility meters and endpoint signals 46 comprise, among other information, consumption data of the corresponding utility meters, including time-of-use consumption data.

When used in conjunction with an electric utility meter, power consumption of an endpoint device is generally not a concern as the associated electrical service provides a readily available power source. However, when used in conjunction with a gas, water, or other non-electric utility meter, such a source is not always available, and because of regulatory issues or costs associated with providing a "hard-wired" power source, not always feasible or desirable. Thus, one desirable feature of an endpoint device, such as endpoint device 32, is that it be able to be battery operated. However, because of maintenance costs associated with battery-operated units (i.e., replacing the batteries), it is also desirable that endpoint devices consume as little energy as necessary in order to extend the operating life of the battery. An industry standard expected battery life for a conventional battery-operated endpoint device utilizing a size AA lithium battery is approximately ten years.

As described above, in one embodiment of the present invention, endpoint device 32 utilizes a SH receiver. Unfortunately, while SH receivers have the advantages of being less susceptible to interference and being able to receive data at rates higher than other types of receivers, such as super-regenerative type receivers, they have the disadvantage of having higher energy consumption. If not addressed, such higher energy consumption would result in endpoint device 32 having an unacceptable battery life as compared to conventional AMR systems having endpoint devices employing super-regenerative type receivers. Therefore, in order to utilize a SH-type receiver and still achieve an industry standard battery life, the energy consumption of the SH receiver must be reduced.

One conventional approach for reducing the power consumption of a SH-type receiver is to maintain the receiver in an "off" state ("sleeping") for a high percentage of time. The receiver is then periodically "awakened", during which time it "listens" for the presence of a reader device. If the endpoint device "hears" a reader device, it responds by transmitting a message including consumption data of its corresponding utility meter.

However, in order to achieve an industry standard battery life, the average current consumption of the receiver must be about 10 microamps ($\mu A$). This means that the duty cycle of the endpoint device needs to be approximately 0.1%. Using the conventional approach, if an endpoint device is awakened every ten seconds, only about 10 milliseconds (mS) are allowed to "listen" for the reader in order to maintain the 10 $\mu A$ average current. If the endpoints "wake up" less frequently than every 10 seconds, they may miss the presence of a mobile reader. Since about 5 ms are required for the endpoint to "wake-up" (i.e., stabilize a crystal oscillator and program a frequency synthesizer), a window of only approximately 5 ms is available every 10 seconds to receive a wake-up message from a reader. If a randomly generated wake-up message is guaranteed to be present in this 5 ms window, the wake-up message could not be longer than 2.5 ms and would need to be repeated every 2.5 ms. This requires that the endpoint be able to receive data at a high data rate—too high to be practically implemented using the conventional power-reducing approach.

To overcome these limitations and enable practical implementation of an SH receiver in a battery-powered endpoint device 32, one embodiment of the present invention, as mentioned above, employs a two-stage "wake-up" procedure of SH receiver 36. The two stage wake-up procedure limits the "on-time" of receiver 36 to achieve a duty cycle of not more than 0.1% and an average current consumption of not more than 10 uA, and thereby enables battery-powered endpoint device 32 to achieve an industry standard battery life. One embodiment of the two-stage wake-up procedure according to the present invention is described generally below.

Initially, the power to receiver 36 is turned off, or in a "sleep" mode. In a first stage, SH receiver 36 is periodically awakened for a first time period during which time controller 40 measures the strength of any signals present. In one embodiment, as mentioned earlier, the signal strength is measured at a predetermined frequency using received signal strength indication (RSSI) techniques. The currently measured RSSI (mRSSI) is then compared to a threshold level (TL). In one embodiment, the predetermined frequency is stored within endpoint device 32 and is the frequency at which reader 34 broadcasts the "wake-up" message.

If the mRSSI does not exceed TL, controller 40 returns receiver 36 to the sleep mode. If the mRSSI is greater than or equal to TL, controller 40 initiates a second stage of the wake-up procedure wherein receiver 36 remains powered-on for a second time period to "listen" for a wake-up message 44 from reader device 34. If no wake-up message 44 is received during the second time period, controller 40 returns receiver 36 to the sleep mode. If controller 40 detects a wake-up message 44 during the second time period, controller 40 causes transmitter 38 to transmit endpoint message 46 and returns receiver 36 to the sleep mode.

In order to maintain a low average operating current, it is important that TL be properly set at a value that limits the number of times receiver 36 reaches the second stage of the wake-up procedure in the absence of a valid wake-up message. Such invalid wake-ups, hereinafter referred to as "false wake-ups", can be caused by noise or by interference which might be generated at the predetermined frequency by another device located within the receiving range of endpoint device 32. The higher the value at which TL is set, the fewer times endpoint device 32 will reach the second wake-up stage in response to a non-wake up signal. However, if TL is set too high, there is a possibility that endpoint device 32 will not respond to a valid wake-up message 44 transmitted by reader 34. Thus, TL must be at a level that enables receiver 36 to receive as many valid wake-up messages as possible, but yet reduces the number of false wake-ups to a level that enables endpoint device 32 to achieve the desired battery life.

In one embodiment, TL is fixed at a predetermined level which is expected to minimize the occurrence of false wake-ups. In one embodiment, the threshold value is dynamic and adjusted up or down based on the mRSSI to thereby optimize, or "tune", the threshold value to the conditions in which endpoint device operates. If the number of false wake-ups is too great, the threshold value is increased. If the number of false wake-ups is too few, meaning that endpoint device 32 may not be receiving valid wake-up messages, TL is decreased.

Figure 2A:
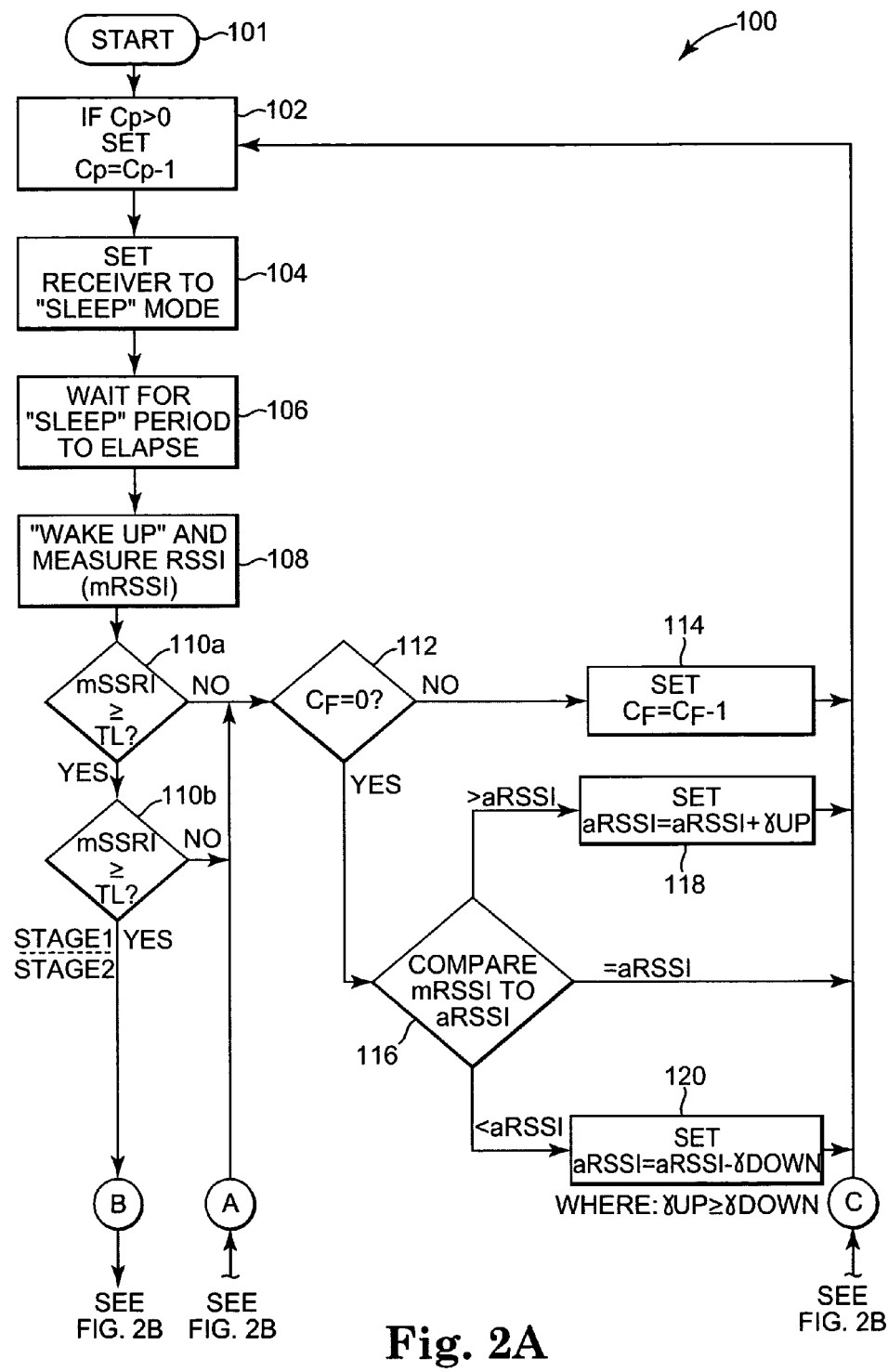
FIG. 2 is a flow diagram illustrating one exemplary process for adjusting a threshold value according to the present invention.
Figure 2B:
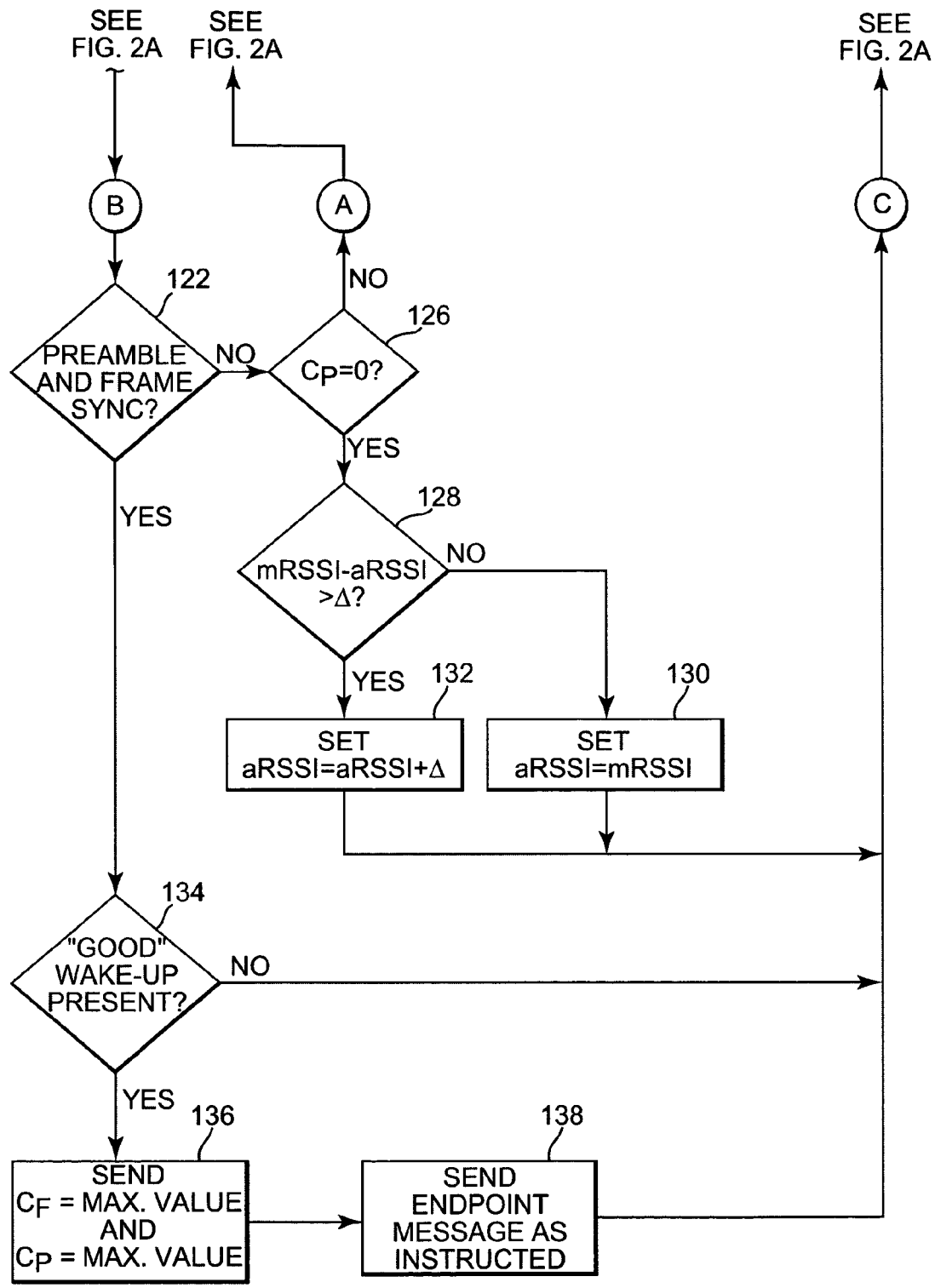

FIGS. 2A and 2B illustrate in flow diagram form one exemplary embodiment of a process 100 employed by endpoint device 32 for optimizing the value of the dynamic threshold level. Process 100 begins at 101. At step 102, a first "hold-off" counter ($C_P$) is decremented by a value of one if $C_P$ is greater than zero. First hold-off counter $C_P$ is described in greater detail below. Process 100 then proceeds to step 104, where receiver 36 is powered-off and placed in "sleep" mode. After a sleep period elapses, as indicated at step 106, process 100 proceeds to step 108. In one embodiment, the sleep period is a fixed period. In one embodiment, the sleep period is adjusted based on operating conditions. In one embodiment, the sleep period has a random duration.

At step 108, receiver 36 "wakes-up" and measures the received signal strength indication (mRSSI) at a predetermined frequency. The "waking up" of receiver 36 includes, among other things, powering-up the receiver and stabilizing a crystal oscillator. Process 100 then proceeds to step 110a where controller 40 queries whether the mRSSI is greater than or equal to TL. In the embodiment illustrated by process 100, TL is a fixed amount (K) above a long-term "average" RSSI (aRSSI), wherein aRSSI is based on previously measured mRSSI values and periodically updated by controller 40 based on mRSSI values of false wake-up signals.

If the answer to the step 110a query is "no", it is assumed that there is no wake-up signal present, and process 100 proceeds to step 112. At step 112, controller 40 queries whether a second hold-off counter ($C_F$) is equal to zero. Second hold-off counter $C_F$ functions to prevent controller 40, for a period of time following receipt of a valid wake-up signal, from updating the aRSSI value based on the currently mRSSI value after a selectable number of wake-ups. If $C_F$ is not equal to zero, process 100 proceeds to step 114. At step 114, $C_F$ is decremented by a value of one and process 100 returns to step 102. If $C_F$ is equal to zero, process 100 proceeds to step 116.

At step 116, controller 40 compares mRSSI to aRSSI. If mRSSI is greater than aRSSI, process 100 proceeds to step 118 where aRSSI is increased by an incremental amount ($\gamma$). If mRSSI is less than aRSSI, process 100 proceeds to step 120 where aRSSI is decreased by $\gamma$. Increasing aRSSI by $\gamma$ has the effect of decreasing the sensitivity of receiver 36 to noise, while decreasing by $\gamma$ increases the likelihood that receiver 36 will not "miss" a valid wake-up message. If mRSSI is equal to aRSSI, and after both step 118 and step 120, process 100 returns to step 102.

If the answer to the step 110a query is "yes", process 100 proceeds to step 110b where controller 40 again queries whether mRSSI is greater than or equal to TL. The purpose of repeating this query at step 110b is to reduce false wake-ups due to noise spikes. If the answer is "no", process 100 proceeds to step 112. If the answer is "yes", receiver 36 remains powered-up for the second time period, and process 100 proceeds to step 122.

At step 122, controller 40 determines whether the signal that caused receiver 36 to reach the second stage of the wake-up procedure is a wake-up message. In one embodiment, as will be described in more detail below, a wake-up message 44 comprises a preamble portion, a frame sync portion, and an informational portion. Also as describe in more detail below, in one embodiment, reader 34 transmits a repeating wake-up message 44. As illustrated at step 122, if endpoint device 32 does not detect a preamble portion and a frame sync portion during the second stage of the wake-up procedure, the signal is presumed to be a false wake-up signal and process 100 proceeds to step 126. In one embodiment, controller 40 checks only for a preamble portion to determine if the signal is a valid wake-up message 44.

At step 126, controller 40 queries whether first hold-off counter $C_P$ is equal to zero. Hold-off counter $C_P$ functions to prevent controller 40, for a period of time following receipt of a valid wake-up signal, from increasing the aRSSI in response to a false wake-up signal caused by a valid wake-up signal that contains errors and, therefore, reduces the likelihood that TL will reach such a high level that valid wake-up messages will not meet the threshold level and therefore not be received by endpoint device 32. This situation is caused when the mobile reader is too far away from the endpoint for successful reception of the wake-up message. If $C_P$ is not equal to zero, process 100 proceeds to step 112. If $C_P$ is equal to zero, process 100 proceeds to step 128.

At step 128, controller 40 queries whether mRSSI exceeds aRSSI by more than a value ($\Delta$). If the answer is "no", process 100 proceeds to step 130, where aRSSI is set to equal the currently measured mRSSI. If the answer to the step 128 query is "yes", process 100 proceeds to step 132 where aRSSI is increased by the $\Delta$ value. In other words, if the mRSSI of the noise or interference is much greater than the current value of aRSSI, aRSSI is immediately increased by the $\Delta$ value in order to quickly reduce the likelihood that endpoint device 32 will continue to respond to the noise or interference if it is generated by a repeating source. After both steps 130 and 132, process 100 returns to step 102.

At step 122, if both a preamble portion and a frame sync portion are detected by endpoint device 32, it is presumed that the signal is a valid wake-up message, and process 100 proceeds to step 134. In one embodiment, process 100 proceeds to step 134 from step 122 upon detecting only a preamble portion. At step 134, controller 40 determines whether the presumed valid wake-up message is a "good" wake-up message. A "good" wake-up message, in addition to the preamble and frame sync portions, also comprises an informational portion with no bit errors. If an informational portion is not detected, it is assumed that the signal is an incomplete wake-up message received from a reader 34 in the vicinity of endpoint device 32, and process 100 returns to step 102 without updating the aRSSI value.

If controller 40 detects an informational portion with no errors, the signal is a valid wake-up signal and process 100 proceeds to step 136. At step 136, first hold-off counter $C_P$ and second hold-off counter $C_F$ are each set to a maximum value. Process 100 then proceeds to step 138, where controller 40 causes transmitter 38 to transmit endpoint message 46 comprising data as instructed by the informational portion of wake-up message 44.

By dynamically "tuning", or optimizing TL based on operating conditions according to process 100, as described by FIGS. 2A and 2B, endpoint device 32 operates receiver 36 at a low duty cycle. In one embodiment, receiver 36 has a duty cycle of not more than 0.1% and an average current of less than 10 uA. This enables endpoint device 32 to employ a SH receiver 36 and yet be able to be battery operated. In one embodiment, when powered by a single size AA lithium battery, endpoint device 32 employing an SH receiver 36 and employing process 100 has an expected battery life of between ten and fifteen years.

Figure 3:
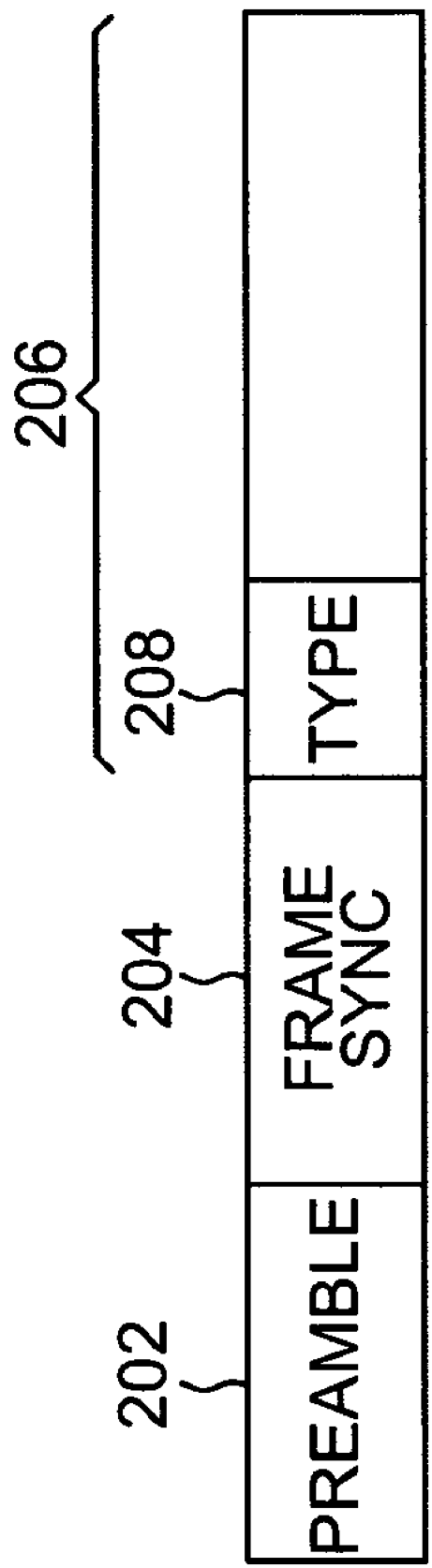
FIG. 3 is a diagram illustrating generally one exemplary structure of a reader message for use with a meter reading system according to the present invention.

As mentioned above, in one embodiment, wake-up message 44 includes a preamble portion, a frame sync portion, and an informational portion. FIG. 3 is a diagram illustrating one example of a wake-up message, or reader message, 200 according to the present invention. Reader message 200 includes a preamble field 202, a frame sync field 204, and an informational field 206. In one embodiment, mobile reader 34 transmits a repeating wake-up message 44/200 that is approximately 50 milliseconds (ms) in duration. In one embodiment, there is a 50 ms "dead time" between wake-up messages. In one embodiment, there is no dead time between wake-up messages. In one embodiment, mobile reader 34 transmits an un-modulated carrier during this dead time so that an endpoint 32 is still able to detect a signal and proceed to the second stage of the wake-up procedure if it "awakens" between messages. Any type of modulation can be employed, including frequency-shift keying (FSK)

modulation and frequency modulation (FM). One embodiment of the present invention employs amplitude-shift keying (ASK) modulation.

Wake-up message 200 can also provide other instructions to endpoint devices 32. In one embodiment, wake-up message 200 instructs a single endpoint device 32 to respond and transmit its endpoint message. In one embodiment, only endpoint devices 32 of a certain group are called to respond. In one embodiment, reader 34 utilizes a "mask" to transmit a wake-up message 44 to which only endpoint devices 32 with associated serial numbers having a desired bit pattern respond.

In one embodiment, informational field 206 includes a sub-field instructing endpoint devices 32 at which frequency to transmit endpoint message 46. In one embodiment, during a meter reading operation, mobile reader 34 continuously modifies the frequency sub-field such that the frequency at which endpoint devices 32 are instructed to transmit corresponding endpoint messages 46 is continually changing within a frequency band. In one embodiment, endpoint devices 32 transmit endpoint messages 46 within the industrial-scientific-medical (ISM) frequency band. Transmitters 38 are crystal-controlled and are thus capable of transmitting accurately at the instructed frequency.

By instructing endpoint devices 32 at which frequency to transmit endpoint messages 46, mobile reader 34 is able to employ fewer receivers than conventional AMR system readers and, thus, is lower in cost. In one embodiment, mobile reader 34 employs a single receiver 48. In one embodiment, mobile reader 34 employs multiple receivers 48. In one embodiment, when employing multiple receivers 48, mobile reader 34 informs endpoint devices 32 via a subfield of information field 206 how many receivers it is utilizing and a "base" endpoint message transmission frequency. Controller 40 of each endpoint device 32 then employs and algorithm to determine a frequency within the ISM band at which it will transmit endpoint message 46 based on the number of reader receivers 48, the base transmission frequency, and an associated endpoint serial number stored in memory 54.

As described above, relative to conventional AMR systems, transmitter 38 comprises a "high" power, "high" data rate transmitter. In one embodiment, transmitter 38 has an output power level of 100 milliwatts (mW), as compared to a ¼ mW output power level of some conventional AMR systems. However, when endpoint device 32 is battery-powered, 100 mW is generally more power than a size AA lithium battery is capable of supplying. Thus, in one embodiment, transmitter 38 employs a storage capacitor to provide the required energy to operate a power amplifier during transmission of an endpoint message.

In one embodiment, the stored energy from the capacitor is provided to the power amplifier for transmission of the endpoint message after the transmitter's frequency synthesizer is programmed to an appropriate endpoint message transmission frequency. However, if stored energy from the capacitor is rapidly applied directly to the power amplifier, the oscillator will deviate from the programmed endpoint message transmission frequency. In order to prevent this frequency deviation, in one embodiment, the loop bandwidth is first increased and then the RF output power is "slowly" ramped up—in approximately one millisecond. The loop bandwidth is then decreased to prevent modulation distortion. The endpoint message is then transmitted. After the endpoint message has been transmitted, the loop bandwidth is again increased and the RF output power reduced.

The transmitter then returns to sleep mode. Endpoint messages 46 are configured to be limited in length so as to have a short transmission duration, so that transmitter 38 is generally turned-on for approximately 10 milliseconds (ms).

In one embodiment, transmitter 38 has a data rate of 100 kilobytes per second (KPBS). In one embodiment, the transmission data rate used by transmitter 38 is either 50 KBPS or 100 KBPS. Per this embodiment, transmitter 38 begins transmitting each endpoint message 46 at a rate of 50 KBPS. Then, based on the frequency sub-field of informational field 206, transmitter 38 continues to transmit the remainder of endpoint message 46 at either 50 KBPS or switches to a transmission rate of 100 KBPS. In one embodiment, AMR system 30 utilizes binary FSK at the 50 KBPS rate and four-level FSK at the 100 KBPS rate. In one embodiment, the symbol rate is fixed at 50 KBPS.

As mentioned earlier, one embodiment of telemetry system 30 includes a GPS system 56 as part of mobile reader 34. Alternately, GPS system 56 can be included within host system 35. When using a mobile reader, such as mobile reader 34, there is a possibility that some endpoint devices 32 will be "missed" during a reading operation. By employing GPS 56 to provide reader 34 with its present geographic location in combination with a database representative of a reception region for each endpoint device 32, telemetry system 30 reduces the likelihood that endpoint devices 32 will be missed during a reading operation. In one embodiment, the database is stored in host system 35. In one embodiment, the database is uploaded to memory 54 from host system 35 prior to a reading operation.

For example, in one embodiment, when mobile reader 34 is performing a reading operation in a geographical area known via GPS 56 and the associated database to have "difficult-to-read" endpoint devices 32 due to high levels of interference, it instructs endpoint devices 32 to transmit at only the 50 KBPS rate. Decreasing the transmission rate from 100 to 50 KBPS is roughly equivalent to increasing the transmitter power by a factor of two, thereby improving the likelihood that mobile reader 34 will successfully read endpoint devices 32.

In one embodiment, telemetry system further includes a voice annunciation system. In one embodiment, when mobile reader 34 knows via GPS 56 and the associated database that a vehicle carrying mobile reader 34 is about to leave the transmission range of a particular endpoint device 32 without having received it's associated endpoint message 46, the voice annunciation system is activated to instruct the vehicle's driver to slow down so that more time is available to receive the missing endpoint. Also, as will be described in greater detail below, reader 34 via endpoint message 44 can individually instruct the missing endpoint device 32 to transmit its endpoint message 46. Reader 34 can also instruct the missing endpoint device 32 to transmit its endpoint message 46 at a lower transmission rate to thereby effectively increase its transmission range.

In one embodiment, if reader 34 leaves a transmission of an endpoint device 32 without receiving its endpoint message 46, the voice annunciation system is activated to instruct the driver of the vehicle to return to a particular location to again attempt to read the missing endpoint device 32. In one embodiment, map is provided showing the location of reader 34 relative to the missing endpoint device 32 indicating via color-coding the best areas for reading the missing endpoint device 32.

With GPS 56 and the associated database, along with the voice annunciation system, the likelihood of missing endpoint devices 32 during reading operations is reduced and the efficiency of reading operations increased. Additionally, telemetry system 30 is configured to accumulate over time a database indicating the signal strength of each endpoint device 32 as a function of its geographic location to thereby provide mobile reader 34 with the optimal location to read a particular endpoint device. Besides being useful for route management of mobile reader 34, such data is useful in locating static reader devices 34 if a user wishes to upgrade telemetry system 30 to a networked-type system.

In one embodiment, meter reading system 30 is configured to transmit data "in the clear", meaning that the transmitted data is not encrypted. In one embodiment, meter reading system 30 provides "secure" transmission of both wake-up message 44 and endpoint messages 46 by utilizing security "keys". Wake-up messages 44 and endpoint messages 46 always include a cyclic redundancy code (CRC). In this embodiment, when computing a wake-up message 44, reader 34 includes a security key in the calculation of the CRC but does not include the security key in the transmitted wake-up message 44.

Endpoint devices 32 are programmed with the security key in advance. Upon receipt of wake-up message 44, endpoint device 32 inserts the key in the proper location within wake-up message 44 and computes the CRC. If the CRC computed by endpoint device 32 does not match the CRC transmitted by reader 34, the wake-up message is invalid. For purposes of calculating the CRC, the security key(s) can be inserted at any point within wake-up messages 44 and endpoint messages 46. In one embodiment, the security key(s) is inserted at the beginning of wake-up messages 44 and endpoint messages 46. The CRC can be any length. In one embodiment, the CRC comprises 32-bits. In another embodiment the CRC is 16 bits. The CRC associated with endpoint messages 46 is calculated in a similar fashion.

In one embodiment, each endpoint device 32 has a unique key that is employed when communicating with reader 34. Thus, even though wake-up messages 44 and endpoint messages 46 are not encrypted, each endpoint's unique security key would need to be individually determined in order for the entire meter reading system 30 to compromised. While not as sophisticated as an encryption-type security system, the effort required to "break" the security key of just one endpoint device 32 makes the occurrence that the entire meter reading system 30 will be compromised highly unlikely. In addition, the use of security keys in this fashion does not increase the length of either wake-up message 44 or endpoint messages 46. Shorter endpoint messages 46 provide the added advantages of reducing the chance of message "collisions" between endpoint devices 32 and minimizing power consumption.

Meter reading system 30 is configured to support multiple wake-up and endpoint and message types. In one embodiment, as illustrated in FIG. 3, wake-up message 200 includes a "message type" field 208 indicating to endpoint device 32 the type of message received and, thus, a corresponding message structure. FIGS. 4–12 illustrate message bit sequences of exemplary message types suitable for use with one embodiment of meter reading system 30 according to the present invention. The following paragraphs describe characteristics common to either the reader message types, the endpoint message types, or both the reader and endpoint message types illustrated by FIGS. 4–12:

1. Reader and End Point Messages:

Data is transmitted most significant bit (MSB) first (e.g., left-to-right in FIGS. 4–12).

2. Reader and End Point Messages:

The first byte following the frame sync bytes is the "Message Type" byte indicating to a recipient the type of reader message it has received.

3. Reader and End Point Messages:

The second byte following the frame sync bytes is the "Flags" byte.

4. Endpoint Messages:

Bit "0" of the "Flags" byte is the "Data Rate" flag indicating to a recipient of the message the data rate at which the endpoint message will be transmitted.

5. Endpoint Messages:

In one embodiment, the transmission data rate of endpoint message 46 through two bytes beyond the "Flags" byte is 50 KBPS. If a 100 KPBS flag bit is set, the remainder of the message will be transmitted at 100 KPBS.

6. Reader and End Point Messages:

A Company Code of "0" is interpreted as all company codes. Endpoint device 32 will respond to Company Code "0" only if programmed to do so. A Company Code "0" is not valid for programming.

7. Reader and End Point Messages:

Device Type Code "0" is interpreted as all device types and causes all device types to respond to a wake-up message if the Company Code and Company Key match. Device Type Code "0" is not valid for programming.

8. Reader Messages:

Delay Flag Bits—Full Duplex Operation:

When not all equal to zero, the delay flag bits indicate a subsequent frequency change. In one embodiment, the value of the delay flag bits multiplied by 100 ms is the time until the next channel will be announced. Endpoint devices will not transmit when the delay flag bits value is non-zero. Enough time remains after setting the delay flag bits to a non-zero value so that endpoints that have received a frequency with the delay flag bits having a zero value have sufficient time to randomize their transmission time and then transmit their endpoint message on the current frequency.

Delay Flag Bits—Half Duplex Operation:

The value of the delay flag bits multiplied by two is the time in seconds until it is clear to transmit.

9. Reader and Endpoint Messages:

The Company Key is a security key that is unique to a company. A company may use as many keys as it desires. For example, a company can employ a separate key for each meter reading route. When modifying a company key, only the delta (difference) between the old key and the new key is transmitted during a programming sequence.

10. Reader and Endpoint Messages:

The Programming Key is a security key that may be unique to each device. In one embodiment, a database matches programming keys with device serial numbers. When each device has its own unique programming key, security is enhanced, as a compromised key allows access to only a single device.

11. Endpoint Messages:

Device Type "1" Endpoint parameters that can be programmed (112 bits total) include:

32-bits, Company Key (see above); 16 bits, Group Address; 16 bits, Bubble-up Period (10 seconds per count with zero indicating no bubble-up); 10 bits, Receiver Channel; 6 bits, Flags (numbered 0 to 5 with bit zero being the Device Type, wherein one indicates an enabled state, bits 1-5 unassigned); and 32 bits, Meter Reading.
12. Endpoint Messages:
Engineering data (all fields 16 bits) includes:
Number of Wake-ups, number of Valid Wake-ups, Number of Frame Errors, Number of Length Errors, Number of CRC Errors (including wrong Company Key, wrong Company Code, wrong Device Type, and bit errors), and number of successful programming messages.
13. Reader and End Point Messages:
The following steps describe generally one embodiment of a programming sequence employed by reader 34 to program endpoint device 32:
  a. Reader 34 transmits a Type 4 reader message to an endpoint device 32 to be programmed, wherein the message instructs the endpoint device to transmit its sequence number and programming data CRC.
  b. Endpoint device 32 responds by transmitting a Type 3 endpoint message including the requested data.
  c. Reader 34 transmits programming data to endpoint device 32 using a Type 5 reader message that incorporates the sequence number from step "b" above.
  d. Endpoint device 32 responds with a Type 4 endpoint message.
  e. Reader 34 verifies the CRC of the message of step "d" to ensure that endpoint device 32 was programmed properly. If reader 34 does not receive confirmation from step "d", reader 34 transmits a Type 4 reader message and verifies the programming data CRC to ensure that endpoint device 32 was properly programmed. If not, reader 34 may initiate another programming sequence. If bit 5 of the "Flag" byte is set to "1" when the Type 4 reader message was transmitted, endpoint device 32 will transmit all parameters just programmed along with the programming data CRC.

FIG. 4 is a diagram illustrating an exemplary embodiment of a Type 1 Reader Message 220 configured to wake-up any endpoint devices 34 within transmission range and have them transmit their associated endpoint message 46. In one embodiment, message 220 is Manchester encoded and employs ASK modulation at data transmission rate of 1.25 KBPS. Type 1 Reader Message 220 includes a 24-bit preamble field 222, a 16-bit frame sync field 224, and an informational field 226. Informational field 226 further includes a 16-bit message type field 228, an 8-bit flag field 230, a 9-bit channel field 232, a 3-bit receiver field 234, a 4-bit message repeat field 236, and a 16-bit CRC field 238. Reader Message 220 further includes a 32-bit Company Key field 240 and a 16-bit Company Code field 242 which are included in the calculation of CRC field 238 but not included in the transmission of Type 1 Reader Message 220. Message 220, excluding preamble field 222, has a length of 72-bits.

Message type field 228 indicates to endpoint device 32 the message topology of the reader message it has received (e.g., Type 1, Type 2, etc.), where the topology refers to what and where information is located within the message. The first byte of the field comprises the type data and the second byte is the complement of the type data, which is employed for error detection. Flag field 230 indicates, among other things, whether reader 34 is full-duplex or half-duplex, the data transmission rate of a remainder of the message, and whether engineering data is also to be included as part of the requested endpoint message.

Channel field 232 indicates the "base" channel, or frequency, at which the endpoint devices 32 are to transmit their associated endpoint messages 46. Receiver field 234 indicates how many receivers are employed by reader 34. Each endpoint device 32, as described above, employs the base channel and the number of receivers in reader 34 as part of a computation to determine the frequency at which it will transmit its associated endpoint message 46. Message field 236 indicates how many times an endpoint 32 is to transmit associated endpoint message 46 in response to each Reader Message 220.

FIG. 5 is a diagram illustrating an exemplary embodiment of a Type 2 Reader Message 250 configured to wake-up a specific endpoint device 34 and command it to transmit its associated endpoint message 46. Reader Message 250 is similar in structure to that of Type 1 Reader Message 220, except that it further includes a 32-bit Endpoint Address field 252. Endpoint address 252 holds the address of the specific endpoint device 32 that reader 34 desires to read. As with reader message 220, reader message 250 is Manchester encoded and employs ASK modulation at data transmission rate of 1.25 KBPS. Reader message 250, excluding preamble field 222, has a length of 104-bits.

FIG. 6 is a diagram illustrating one exemplary embodiment of a Type 3 Reader Message 260 configured to wake-up endpoint devices 34 belonging to a particular group and command them to transmit their associated endpoint messages 46. Reader Message 260 is similar in structure to that of Type 1 Reader Message 220, except that it further includes a 16-bit Sub-net Mask Field 262 and a 16-bit Group Address field 264. Group address field 264 contains the bits of the group of endpoint devices 32 being called. Sub-net mask field 262 indicates which bits of the group address field 264 are to be used by the endpoint devices 32 in determining whether to respond to reader message 260, wherein mask field 264 is used only when a corresponding mask flag is set to zero. As with Type 1 Reader Message 220, reader message 250 is Manchester encoded and employs ASK modulation at data transmission rate of 1.25 KBPS. Reader message 250, excluding preamble field 222, has a length of 104-bits.

FIG. 7 is a diagram illustrating an exemplary embodiment of Type 4 Reader Message 270 configured to wake-up a specific endpoint device 32 for programming, and have it transmit a sequence number and a CRC of its programming parameters. The sequence number and programming parameters will be discussed in more detail below. Reader message 270 is similar in structure to Type 2 Reader Message 250, except that receiver field 234 and message repeat field 236 are removed, CRC field 238 comprises 32-bits, and company key field 240 is replaced with a 32-bit programming key field 272. As with Type 1 Reader Message 220, reader message 270 is Manchester encoded and employs ASK modulation at data transmission rate of 1.25 KBPS. Type 4 Reader Message 270, excluding preamble field 222, has a length of 120-bits.

Programming key field 272 contains a programming key unique to the specific endpoint device 32 that is to be programmed. In one embodiment, the unique programming key for each endpoint device 32 is stored in a database accessible by reader 34. In one embodiment, the programming key database is uploaded to memory 54 of reader 34 from host system 35. Without the proper programming key, reader 34 will be unable to program endpoint device 32. By employing a programming key unique to each endpoint device 32, telemetry system 30 can remotely program the functionality of endpoint devices 34. Such a feature is not available in conventional AMR systems where a programming device must be positioned proximate to and provide a high strength signal to an endpoint device that is to be programmed. This often requires access to a facility in which the endpoint device is located, something not necessary with telemetry system 30 according to the present invention.

Figure 8:
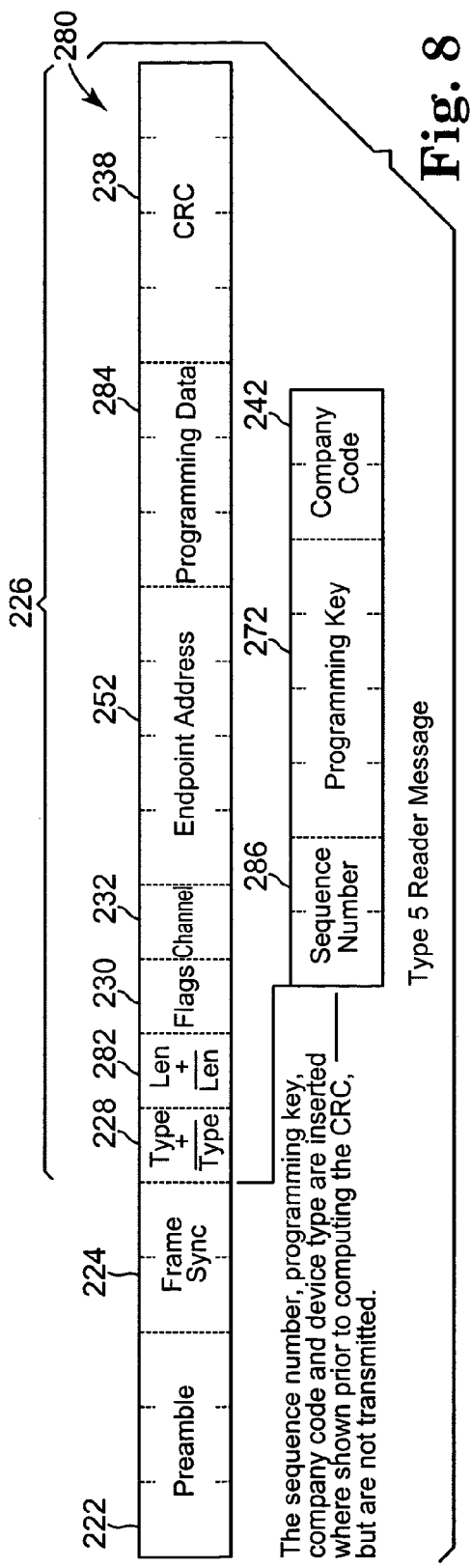
FIG. 8 is a diagram illustrating one exemplary embodiment of a Type 5 Reader Message for use with a meter reading system according to the present invention.

FIG. 8 is a diagram illustrating an exemplary embodiment of Type 5 Reader Message 270 configured to wake-up and transmit programming parameters to a specific endpoint device 32. Type 5 Reader Message 280 is similar to Type 4 Reader Message 270, except that it further includes a 16-bit Length field 282, a variable length Programming Data field 284, and a 16-bit Sequence Number field 286. As with Type 1 Reader Message 220, reader message 270 is Manchester encoded and employs ASK modulation at data transmission rate of 1.25 KBPS. Type 4 Reader Message 270, excluding preamble field 222, has a length of 136-bits plus the length of programming data field 284.

The first byte of length field 282 indicates a message length, with the second byte being the complement of the first byte for error detection. Program data field 284 comprises programming data to set the functionality of the specific endpoint device 32 being programmed. Sequence number field 286 comprises data representative of a sequence number of the specific endpoint device 32 being programmed. The sequence number is received from the specific endpoint device to be programmed in response to Reader Message Type 4 above, as will be further described below and by FIGS. 11 and 12. Each endpoint device 32 tracks the number of programming related reader messages it receives. Each time a programming related message is received, the sequence number is incremented. The sequence number has both an error detection function and a security function. During a programming exchange between reader 34 and endpoint device 32, if endpoint device 32 receives a reader message not having the next expected sequence number, it will assume that a reader message has been "missed" (not received) during the programming sequence, or that a non-certified third party has intercepted and is retransmitting a previously receiving programming message. In either case, endpoint device 32 treats a reader message having sequence number that is out of sequence as an error and will not accept the programming data in field 284.

Figure 9:
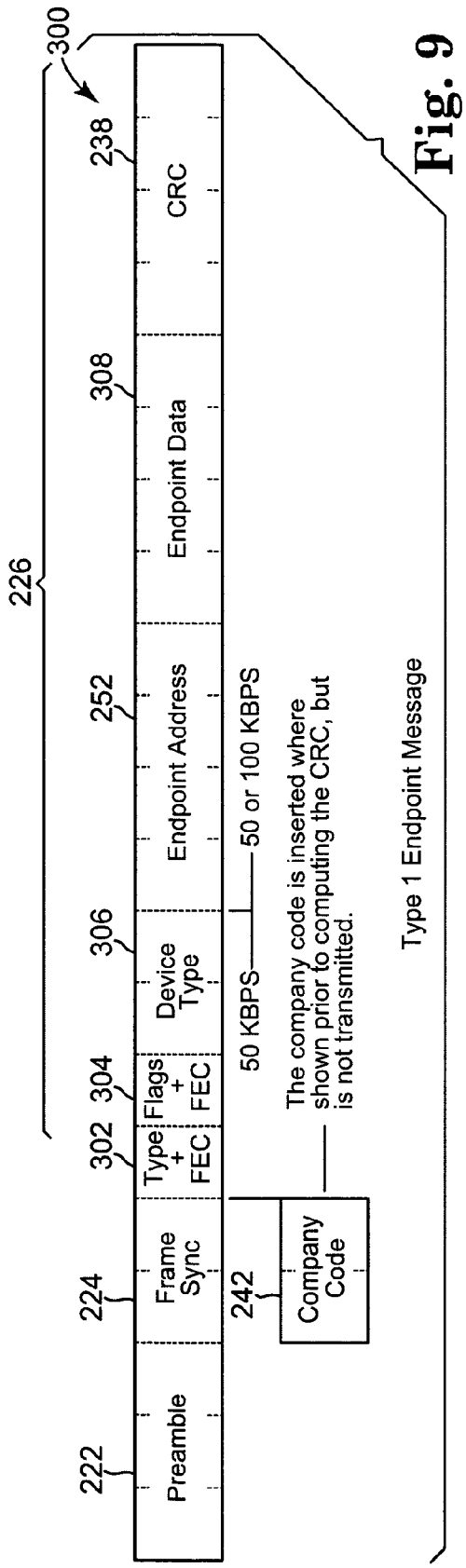
FIG. 9 is a diagram illustrating one exemplary embodiment of a Type 1 Endpoint Message for use with a meter reading system according to the present invention.

FIG. 9 is a diagram illustrating one exemplary embodiment of a Type 1 Endpoint Message 300 configured to respond to the reader 34 with data related to the use of host device 42. In one embodiment, message 300 is Manchester encoded and employs FSK modulation at a data transmission rate of either 50 KBPS or 100 KBPS, as requested reader 34. Type 1 Endpoint Message 300 includes a 48-bit preamble field 222, 16-bit frame sync filed 224, 32-bit endpoint address field 252, 32-bit CRC field 238, and 16-bit company code field 242. Endpoint Message 300 further includes a 16-bit type field 302, a 16-bit flags field 304, a 16-bit device type field, and a 32-bit endpoint data field. Frame sync field 224, type field 302, and flags field 304 are transmitted at 50 KPBS, with the remaining fields of informational portion 226 being transmitted at either 50 KBPS or 100 KBPS. When transmitting at 50 KBPS, binary FSK is employed, and when transmitting at 100 KBPS, four-level FSK is employed. Type 1 Endpoint Message 300, excluding preamble field 222, has a length of 160-bits.

Type field 302 indicates to reader 34 the topology of the message, with the first byte comprising the topology data and the second byte comprising forward error correction (FEC) data bits to enable forward error correction of type field 302 data by host system 35. Flags field 304 comprises a first byte of flags data and a second byte of FEC data for forward error correction of flags field 304 data. Device type field 306 comprises data identifying the device type of associated endpoint device 32 to reader 34. Endpoint data field 308 comprises data related to the use of host device 42. For example, if host device 42 is an electric utility meter, endpoint data field 308 may comprise time-of-use electrical consumption data.

Figure 10:
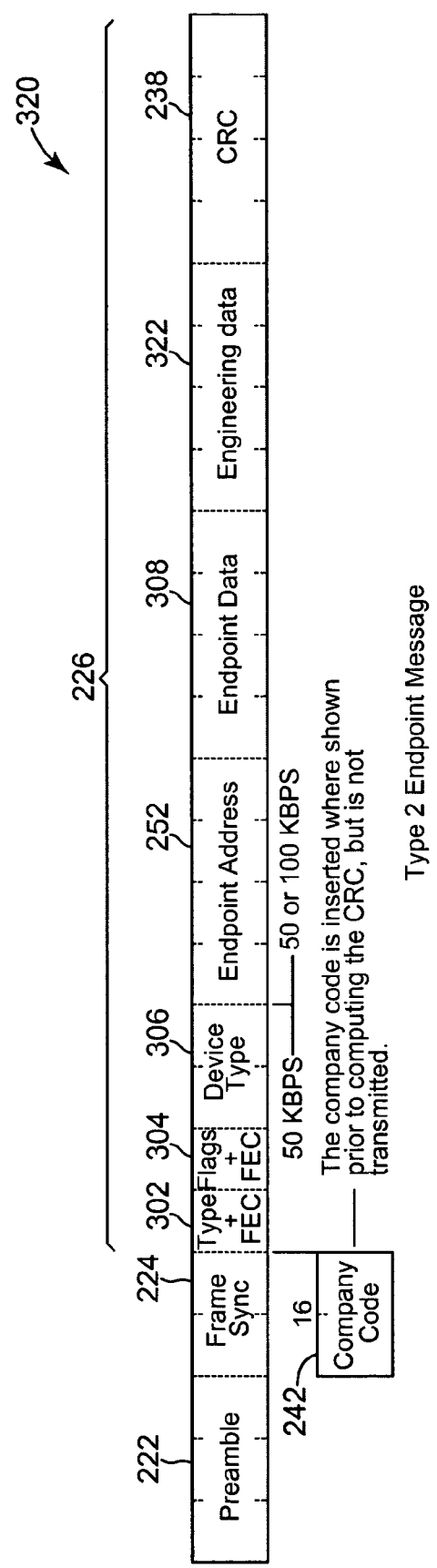
FIG. 10 is a diagram illustrating one exemplary embodiment of a Type 2 Endpoint Message for use with a meter reading system according to the present invention.

FIG. 10 is a diagram illustrating one exemplary embodiment of a Type 2 Endpoint Message 320 configured to respond to the reader with the endpoint device data and the endpoint device engineering data. Endpoint message 320 is similar in structure to Type 1 Endpoint Message 300, except that it further includes an engineering data field 322. Engineering data field 322 comprises data related to the operation of associated endpoint device 32, such as how many false wake-ups have occurred and the level at which the threshold is set. As with endpoint message 300, endpoint message 320 is Manchester encoded and employs FSK modulation at a data transmission rate of either 50 KBPS or 100 KBPS, as requested reader 34. Frame sync field 224, type field 302, and flags field 304 are transmitted at 50 KPBS, with the remaining fields of informational portion 226 being transmitted at either 50 KBPS or 100 KBPS. When transmitting at 50 KBPS, binary FSK is employed, and when transmitting at 100 KBPS, four-level FSK is employed. Type 2 Endpoint Message 320, excluding preamble field 222, has a length of 304-bits.

FIG. 11 is a diagram illustrating one exemplary embodiment of a Type 3 Endpoint Message 330 configured to provide the endpoint's corresponding programming sequence number and the CRC of the programming parameters in response to the Type 4 reader message described above by FIG. 7. Endpoint message 330 is similar in structure to Type 2 Endpoint Message 300, except that it includes a 16-bit sequence number field 332 and a 16-bit parameter CRC field 334 in lieu of endpoint data and engineering data fields 308 and 322. As with Type 1 Endpoint Message 300, endpoint message 330 is Manchester encoded and employs FSK modulation, but transmits only at a data transmission rate of 50 KBPS. Type 3 Endpoint Message 330, excluding preamble field 222, has a length of 144-bits.

Data field 332 contains data representative of a sequence number. As described by FIG. 8 above, endpoint devices 32 maintain a sequence number of programming-related reader messages for security and error checking purposes. Data field 334 comprises a CRC based on operating parameters presently stored in endpoint device 32. In one embodiment, reader 34 includes a database of the present operating parameters of each endpoint device 32, and uses the parameter CRC of data field 334 as a way to verify that the operating parameters in the database match the present operating parameters within endpoint device 32.

FIG. 12 is a diagram illustrating one exemplary embodiment of a Type 4 Endpoint Message 340 configured to respond to the reader with the endpoint's corresponding programming sequence number, the CRC of the programming parameters, and the programmed parameter values. Endpoint message 340 is similar in structure to Type 3 Endpoint Message 330, except that it includes a 16-bit length field 342, and a variable-length data field 344 in lieu of sequence number and CRC parameter data fields 332 and 334. As with Type 3 Endpoint Message 330, endpoint message 340 is Manchester encoded and employs FSK modulation at a data transmission rate of 50 KBPS for the entire message. Type 4 Endpoint Message 340, excluding preamble field 222, has a length of 128-bits plus the length of data field 344.

Length field 342 comprises a first byte that indicates a length of all data fields that follow it in the message structure, and a second byte of FEC data for forward error correction of length field 342 data by host system 35. Data field 344 includes the endpoint device's present sequence number, the CRC of its program parameters, and the actual program parameters.

Figure 13:
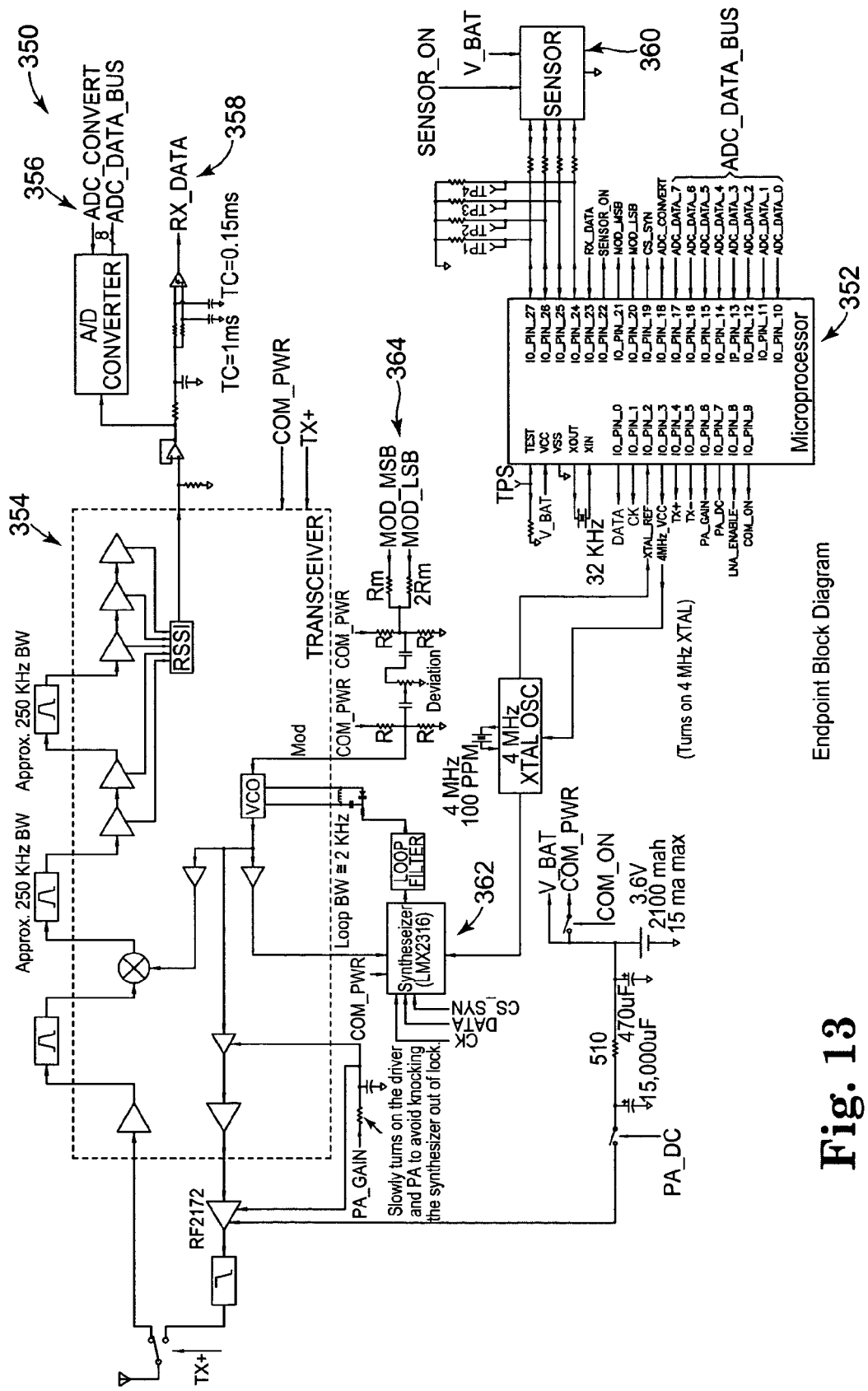
FIG. 13 is schematic block diagram illustrating generally one exemplary embodiment of a reader device according to the present invention.

FIG. 13 is a detailed block and schematic diagram illustrating one exemplary embodiment of endpoint device 350 according to the present invention. Endpoint device 32 includes a controller 352, a transceiver 354, and an A/D converter 356. A/D converter 356 is configured to measure the RSSI of received signals, with the RX_DATA output 358 having a high/low state based on whether the measured RSSI is above or below the threshold level. Sensor 360 is configured to receive data from the host device, such as a utility meter. A frequency synthesizer 362 sets the transmitting and receiving frequencies of transceiver 354. Inputs MOD_MSB and MOD_LSB from the controller set the data transmission deviation of transceiver 354 as required for the particular bit being sent and is dependent on whether the bit is set at 50 KBPS or 100 KBPS (2-level or 4-level FM).

In summary, using a two-stage wake-up procedure so that receiver 36 is powered-on for the second time period only when a measured signal strength is above a dynamically adjusted threshold level enables endpoint device 32 to utilize a superheterodyne receiver and yet be powered from a AA lithium battery and have at a minimum an industry standard battery life. A superheterodyne receiver allows endpoint device 32 to receive more data in a shorter amount of time than existing ultra low current telemetry systems using a super-regenerative receiver. This enables reader 34 to transmit more complex instructions to endpoint devices 32, including secure programming messages which enable endpoint devices 32 to be remotely programmed and thus not require access to facilities in which they are located as is required by existing systems using super-regenerative receivers. Also, including a frequency on which endpoint devices 32 are to respond within the wake-up messages 44 enables transmitters 38 to be crystal-controlled and reader devices 34 to be smaller and less expensive than conventional readers. Furthermore, superheterodyne receivers also have a narrower bandwidth as compared to super-regenerative receivers employed in existing systems, thereby reducing potential occurrences of interference.

Additionally, using a high-power, high-data rate transmitter 38 allows endpoint devices 32 to transmit more data in a shorter time period and over greater distances than those of conventional telemetry systems. The higher data transmission rate enables endpoint devices 32 to transmit more data to a mobile reading device, including time-of-use consumption data of utility meters when telemetry system 30 is employed as an AMR system. The higher power enables the use of fewer static reading devices if a user chooses to convert telemetry system 30 to a networked system.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. This application is intended to cover any adaptations or variations of the preferred embodiments discussed herein. Therefore, it is manifestly intended that this invention be limited only by the claims and the equivalents thereof.

What is claimed is:

1. A telemetry system comprising:
    an endpoint device configured to operably couple to a host device, the endpoint device comprising:
        a receiver normally powered-off and configured to periodically power-on for a first time period and to remain powered on for a second time period in response to a signal strength of signals received during the first time period being at least equal to a threshold level, otherwise to power-off; and
        a transmitter configured to transmit an endpoint signal in response to the receiver receiving a wake-up signal during the second time period; and
    a reader configured to transmit the wake-up signal and to receive the endpoint signal.

2. The system of claim 1, wherein the endpoint signal comprises information related to the operation of the host device and/or the endpoint device.

3. The system of claim 1, wherein the endpoint device is battery-powered.

4. The system of claim 3, wherein the battery is a size AA lithium battery, and wherein the battery has an expected battery-life of at least 10 years.

5. The system of claim 1, wherein in the receiver has a duty cycle of not more than 0.1 percent.

6. The system of claim 1, wherein in the receiver has a duty cycle of 100 percent.

7. The system of claim 1, wherein the receiver comprises a superheterodyne receiver.

8. The system of claim 7, wherein the superheterodyne receiver has an average current consumption of approximately 10 microamps.

9. The system of claim 1, wherein the receiver is configured to power-on for the first time period at fixed intervals.

10. The system of claim 1, wherein the receiver is configured to power-on for the first time period at random intervals.

11. The system of claim 1, wherein the threshold level comprises a fixed level.

12. The system of claim 1, wherein the endpoint device further includes a controller coupled to the receiver and configured to measure the signal strength of the signals received during the first time period.

13. The system of claim 12, wherein the signal strength is measured at a selectable frequency.

14. The system of claim 12, wherein the controller is configured to the measure the signal strength using received signal strength indication (RSSI) techniques.

15. The system of claim 1, wherein the controller is further configured to adjust the threshold level based on a measured signal strength of non-wake-up signals.

16. The system of claim 15, wherein the controller increases the threshold level in response to the measured signal strength being at least equal the threshold level, and decreases the threshold level in response to the measured signal strength being less than the threshold level.

17. The system of claim 1, wherein the endpoint device transmitter has an output power of up to one hundred milliwatts.

18. The system of claim 1, wherein the endpoint device transmitter has an output power of at least one hundred milliwatts.

19. The system of claim 17, wherein the endpoint device is battery-powered and includes a storage capacitor to power the transmitter transmission of the endpoint signal so as to limit a drain on the battery.

20. The system of claim 1, wherein the transmitter of the endpoint device is configured to transmit the endpoint signal at fixed time intervals regardless of whether the receiver receives a wake-up signal.

21. The system of claim 1, wherein the wake-up signal instructs the endpoint device as to the composition of the information of the endpoint signal.

22. The system of claim 1, wherein the wake-up signal instructs the transmitter of the endpoint device to transmit the endpoint signal at a particular frequency.

23. The system of claim 1, wherein the reader further includes a global positioning system configured to provide a present geographic position of the reader, wherein the reader is configured to adjust a composition of the wake-up signal based on its present geographic position.

24. The system of claim 23, wherein the reader further includes a voice annunciation system configured to indicate when the endpoint device transmitter does not transmit an endpoint signal in response to a wake-up signal.

25. The system of claim 1, wherein in the receiver has a duty cycle of not more than 0.1 percent.

26. The system of claim 1, wherein the receiver comprises a superheterodyne receiver.

27. The system of claim 26, wherein the superheterodyne receiver has an average current consumption of approximately 10 microamps.

28. The system of claim 1, wherein the controller is configured to measure the signal strength of signals received during the first time period.

29. The system of claim 28, wherein the signal strength is measured at a selectable frequency.

30. The system of claim 28, wherein the controller is configured to measure the signal strength using received signal strength indication (RSSI) techniques.

31. The system of claim 28, wherein the controller is configured to adjust the threshold level based on a measured signal strength of non-wake-up singals.

32. The system of claim 31, wherein the controller increases the threshold level in response the measured signal strength being at least equal to the threshold level and decreased the threshold level in response to the measures signal strength being less than the threshold level.

33. An endpoint device comprising:
a receiver configured to be normally powered-off;
a controller configured to periodically power-on the receiver for a first time period and to keep the receiver powered-on for a second time period in response to a signal strength of signals received during the first time period being at least equal to a threshold level, otherwise to power-off the receiver until a subsequent first time period; and
a transmitter configured to transmit an endpoint signal in response to the receiver receiving a wake-up signal during the second time period, and a reader configured to transmit the wake-up signal and to receive the endpoint signal.

34. The system of claim 33, wherein the endpoint signal comprises information related to the operation of the host device and/or the endpoint device.

35. The system of claim 33, wherein the endpoint device is battery-powered.

36. The system of claim 35, wherein the battery is a size AA lithium battery, and wherein the battery has an expected battery-life of at least 10 years.

37. The system of claim 33, wherein the endpoint device is AC mains powered.

38. The system of claim 33, wherein the receiver is configured to power-on for the first time period at fixed intervals.

39. The system of claim 33, wherein the receiver is configured to power-on for the first time period at random intervals.

40. The system of claim 33, wherein the threshold level comprises a fixed level.

41. An automated meter reading system comprising:
an endpoint device configured to operably couple to a utility, the endpoint device comprising:
a superheterodyne (SH) receiver configured to be normally powered-off;
a controller configured to periodically power-on the SH receiver for a first time period and to keep the SH receiver powered-on for a second time period in response to a signal strength of signals received during the first time period being at least equal to a threshold level, otherwise to power-off the SH receiver until a subsequent first time period; and
a transmitter configured to transmit an endpoint signal in response to the receiver receiving a wake-up signal during the second time period, and
a reader configured to transmit the wake-up signal and to receive the endpoint signal.

42. The system of claim 41, wherein the endpoint signal comprises information related to the operation of the utility meter and/or the endpoint device.

43. The system of claim 41, wherein the endpoint device is battery-powered.

44. The system of claim 41, wherein the battery is a size AA lithium battery, and wherein the battery has an expected battery-life of at least 10 years.

45. The system of claim 41, wherein the endpoint device is AC mains powered.

46. The system of claim 41, wherein the SH receiver has a duty cycle of not more than 0.1 percent.

47. The system of claim 41, wherein the SH receiver has an average current consumption of approximately 10 microamps.

48. The system of claim 41, wherein the controller is configured to power-on the SH receiver for the first time period at fixed intervals.

49. The system of claim 41, wherein the controller is configured to power-on the SH receiver for the first time period at random intervals.

50. The system of claim 41, wherein the threshold level is fixed.

51. The system of claim 41, wherein the controller is configured to measure the signal strength of signals received during the first time period.

52. The system of claim 51, wherein the signal strength is measured at a selectable frequency.

53. The system of claim 51, wherein the controller is configured to measure the signal strength using received signal strength indication (RSSI) techniques.

54. The system of claim 53, wherein the controller is configured to adjust the threshold level based on a measured signal strength of non-wake-up singals.

55. The system of claim 54, wherein the controller increases the threshold level in response the measured signal strength being at least equal to the threshold level and decreased the threshold level in response to the measures signal strength being less than the threshold level.

56. The system of claim 41, wherein the endpoint device transmitter has an output power of up to one hundred milliwatts.

57. The system of claim 41, wherein the endpoint device transmitter has an output power of at least one hundred milliwatts.

58. The system of claim 56, wherein the endpoint device is battery-powered and includes a storage capacitor to power the transmitter transmission of the endpoint signal so as to limit a drain on the battery.

59. The system of claim 41, wherein the transmitter of the endpoint device is configured to transmit the endpoint signal at fixed time intervals regardless of whether the receiver receives a wake-up signal.

60. The system of claim 41, wherein the wake-up signal instructs the endpoint device as to the composition of the information of the endpoint signal.

61. The system of claim 41, wherein the wake-up signal instructs the transmitter of the endpoint device to transmit the endpoint signal at a particular frequency.

62. The system of claim 41, wherein the reader further includes a global positioning system configured to provide a present geographic position of the reader, wherein the reader is configured to adjust a composition of the wake-up signal based on its present geographic position.

63. The system of claim 62, wherein the reader further includes a voice annunciation system configured to indicate when the endpoint device transmitter does not transmit an endpoint signal in response to a wake-up signal.

64. A method of operating a telemetry system, the method comprising:
   maintaining a receiver of an endpoint device in a normally powered-off state;
   powering on the receiver for a first period time period;
   measuring a signal strength of signals received during the first time period;
   maintaining the receiver in a powered-on state for a second time period in response to the signal strength being at least equal to a threshold level;
   transmitting an endpoint signal from the endpoint device in response to receiving a wake-up signal during the second time period; and
   adjusting the threshold level based on the measured signal strength in response to a wake-up signal not being received during the second time period.

65. The method of claim 64 further comprising:
   measuring the signal strength using received signal strength indication (RSSI) techniques.

66. The method of 64, further comprising:
   increasing the threshold level in response to the measured signal strength being at least equal to the threshold level; and
   decreasing the threshold level in response to the measured signal strength being less than the threshold level.

67. The method of claim 64, further comprising:
   transmitting a wake-up signal instructing the endpoint device to transmit the endpoint signal at a specific frequency.

* * * * *